(12) United States Patent
Hemingway et al.

(10) Patent No.: US 12,107,448 B1
(45) Date of Patent: *Oct. 1, 2024

(54) OUTDOOR LIGHTING AND POWER CHARGING STATION

(71) Applicant: The Wiremold Company, West Hartford, CT (US)

(72) Inventors: Jeffrey Hemingway, Burlington, CT (US); Steven C. Thibault, Harwinton, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 274 days.

This patent is subject to a terminal disclaimer.

(21) Appl. No.: 17/697,313

(22) Filed: Mar. 17, 2022

Related U.S. Application Data

(63) Continuation of application No. 16/780,011, filed on Feb. 3, 2020, now Pat. No. 11,283,272, which is a continuation-in-part of application No. 15/284,918, filed on Oct. 4, 2016, now Pat. No. 10,554,059.

(60) Provisional application No. 62/237,837, filed on Oct. 6, 2015.

(51) Int. Cl.
| | |
|---|---|
| *H02J 7/00* | (2006.01) |
| *F21S 8/08* | (2006.01) |
| *H02J 7/02* | (2016.01) |
| *H02J 7/14* | (2006.01) |
| *F21W 131/10* | (2006.01) |

(52) U.S. Cl.
CPC ............. *H02J 7/0042* (2013.01); *F21S 8/083* (2013.01); *H02J 7/00034* (2020.01); *H02J 7/02* (2013.01); *F21W 2131/10* (2013.01)

(58) Field of Classification Search
CPC ......... H02J 7/0042; H02J 7/00034; H02J 7/02
USPC .................................................. 320/149, 134
See application file for complete search history.

(56) References Cited

U.S. PATENT DOCUMENTS

| | | | | |
|---|---|---|---|---|
| 11,283,272 | B1 * | 3/2022 | Hemingway | H02J 7/0042 |
| 2010/0013434 | A1 * | 1/2010 | Taylor-Haw | G07F 15/003 |
| | | | | 320/109 |
| 2014/0232320 | A1 * | 8/2014 | Ento July | B60L 53/51 |
| | | | | 320/108 |
| 2015/0042278 | A1 * | 2/2015 | Leary | B60L 1/02 |
| | | | | 901/30 |
| 2015/0077239 | A1 * | 3/2015 | Litjen | B60L 53/16 |
| | | | | 320/109 |
| 2015/0108841 | A1 * | 4/2015 | Weber | H02J 4/00 |
| | | | | 307/31 |

* cited by examiner

*Primary Examiner* — Alexis B Pacheco
(74) *Attorney, Agent, or Firm* — McCormick, Paulding & Huber, PLLC

(57) ABSTRACT

A charging station for providing power connections, charging and/or data connections includes one or more wiring devices mounted to a power module that slides in the housing of the main assembly of the charging station such that each wiring device is recessed from the outer surface of the charging station. A back wall of the power module serves as a barrier between different branch circuits for code compliance. The charging station includes a cover assembly with a sloped upper surface and is constructed so that most of the required electrical connections are made on the power module prior to the assembly of the charging station.

22 Claims, 17 Drawing Sheets

OUTDOOR LIGHTING AND POWER CHARGING STATION

CROSS-REFERENCE TO RELATED APPLICATIONS

This application is a continuation of U.S. patent application Ser. No. 16/780,011, filed Feb. 3, 2020, which is a continuation-in-part of U.S. patent application Ser. No. 15/284,918, filed Oct. 4, 2016, which claims priority to U.S. Provisional Patent Application No. 62/237,837, filed Oct. 6, 2015, each of which is hereby incorporated by reference herein in its entirety.

FIELD OF THE PRESENT DISCLOSURE

The present disclosure relates to outdoor charging stations or posts for providing lighting and power connections.

BACKGROUND OF THE PRESENT DISCLOSURE

Bollards for providing outdoor lighting are known. Such structures are found in a variety of locations where outdoor lights at the sight level and below are required, such as parking lots and walkways. Outdoor power connections are also known and generally attached to the outside of the bollards. Weatherproofing is provided by, for example, a hinged cover that extends well beyond the outer surface of the bollard.

BRIEF SUMMARY OF THE PRESENT DISCLOSURE

One object of the present disclosure is to provide a single charging station for supplying both outdoor lighting and power connections in a bollard-type structure.

Another object is to provide a charging station that has a more modular construction to make it easier for an installer to make and replace the wiring connections required so that the charging station can provide lighting as well as power connections.

A further object is to provide a charging station that is weatherproof and includes at least one of power, charging and/or data connections.

According to the present disclosure, a charging station includes a main assembly having an outer frame and a power module enclosed by the frame and including at least one receptacle forming a power connection, charging connection, or a data connection, such that the at least one power connection, charging connection, or data connection is recessed from the outer frame. The charging station may include a cover assembly configured to be mounted at an upper end of the main assembly or a lighting module/assembly mounted thereon. The cover assembly includes an upper surface sloped relative to an upper surface of the main assembly or lighting module/assembly mounted thereon. The charging station may also include a wiring opening formed through the back side of the main assembly, allowing power and/or data wiring to be fed into the main assembly therethrough, and a removable cover adapted to cover and close the wiring opening when the wiring opening is not being used.

These and other objects, features and advantages of the present disclosure will become apparent in light of the detailed description of embodiments thereof, as illustrated in the accompanying drawings.

DETAILED DESCRIPTION OF THE DRAWINGS

Figure 1:
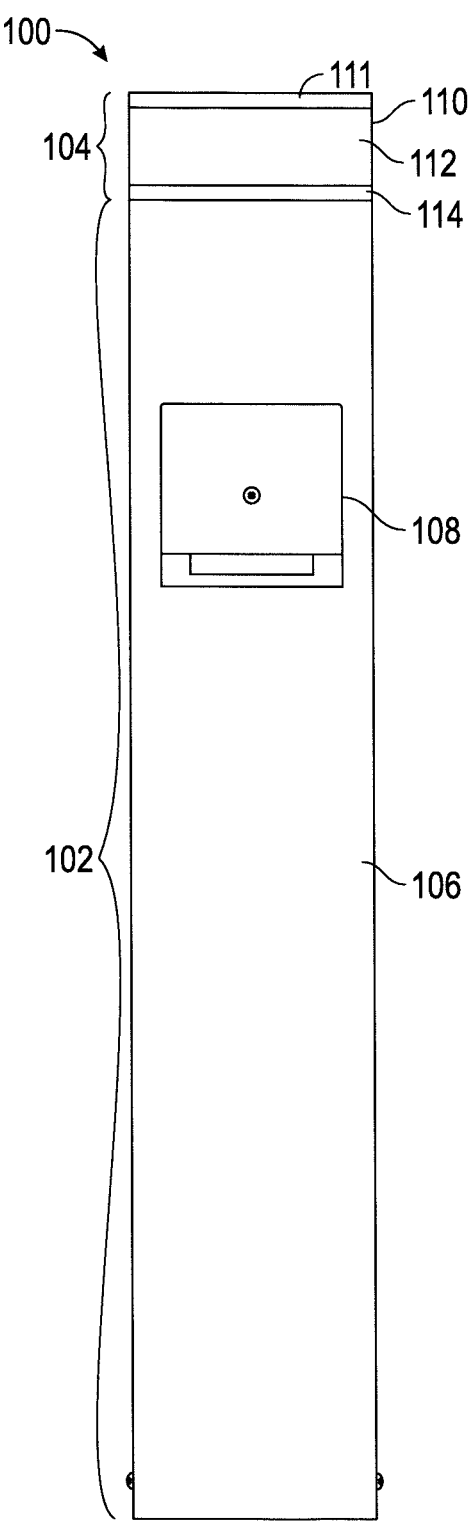
FIG. 1 is a front view of a charging station according to the present disclosure.

Before the various embodiments are described in further detail, it is to be understood that the invention is not limited to the particular embodiments described. It will be understood by one of ordinary skill in the art that the systems described herein may be adapted and modified as is appropriate for the application being addressed and that the systems described herein may be employed in other suitable applications, and that such other additions and modifications will not depart from the scope thereof.

In the drawings, like reference numerals refer to like features of the systems of the present application. Accordingly, although certain descriptions may refer only to certain figures and reference numerals, it should be understood that such descriptions might be equally applicable to like reference numerals in other figures.

FIG. 1 shows a front view of a charging station 100 according to the present disclosure. Charging station 100 has a bollard-type structure, and includes a main assembly 102 and a lighting assembly 104. Main assembly 102 includes an elongated outer frame 106. The front of frame 106 contains an opening that can be closed with a sliding door 108. Lighting assembly 104 sits on top of the main assembly 102. The lighting assembly includes an outer housing 110. The outer housing 110 of lighting assembly 104 has an opaque section 112 as well as a translucent section 114. The translucent section 114 transmits light generated by a lighting module located within the lighting assembly, for example, an LED lighting module or the like.

Figure 2:
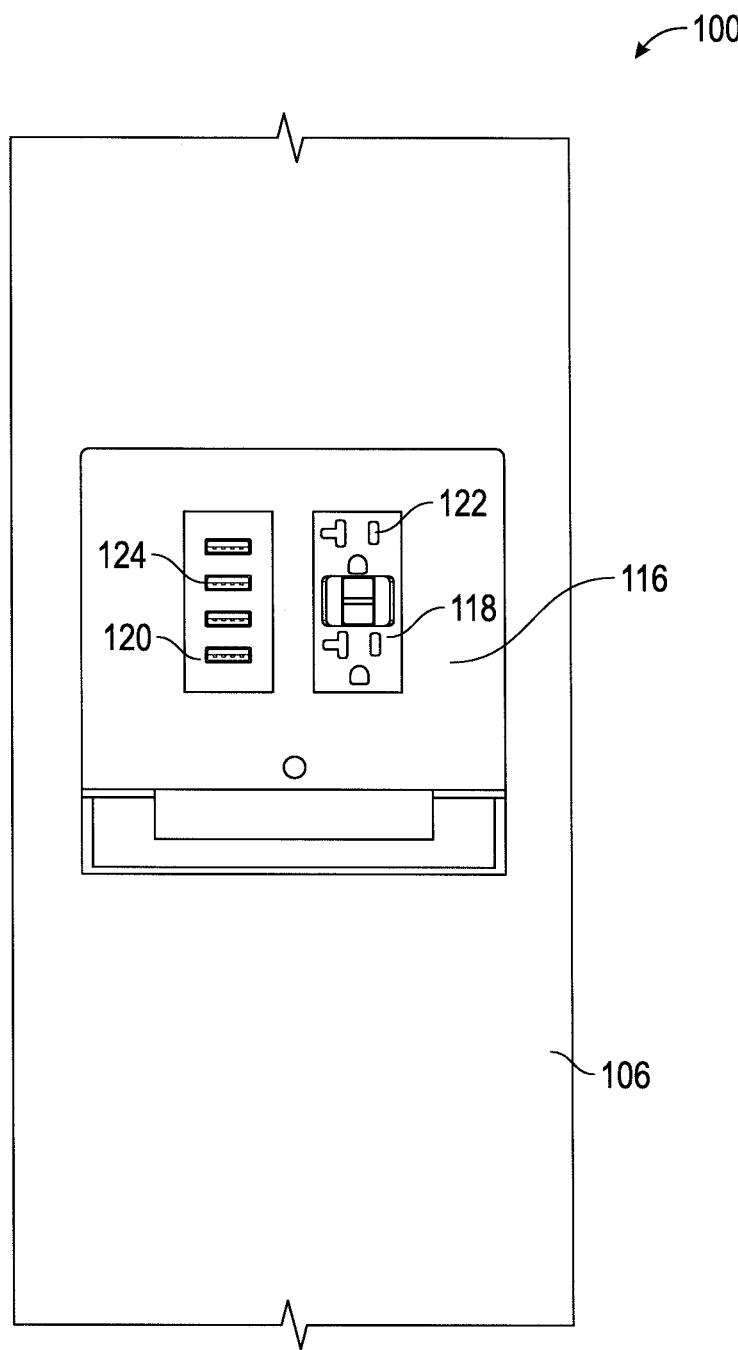
FIG. 2 is an enlarged front view of a portion of the charging station shown in FIG. 1 with a sliding door in an open position.

FIG. 2 shows a front view of a portion of the charging station 100 showing the opening with the sliding door 108 in the open position. When the sliding door 108 is in the open position, an internal chamber 116 in the charging station becomes accessible through the opening. The front faces of electrical wiring devices 118, 120 are located at the back of internal chamber 116. The front faces of electrical wiring devices 118, 120 include receptacles for making power and charging connections such as receptacle 122 for receiving a standard electrical plug and receptacle 124 for receiving a USB plug, including a USB Type-C connector or the like. As such, charging station 100 can provide connections to power and charge electrical devices.

Figure 3:
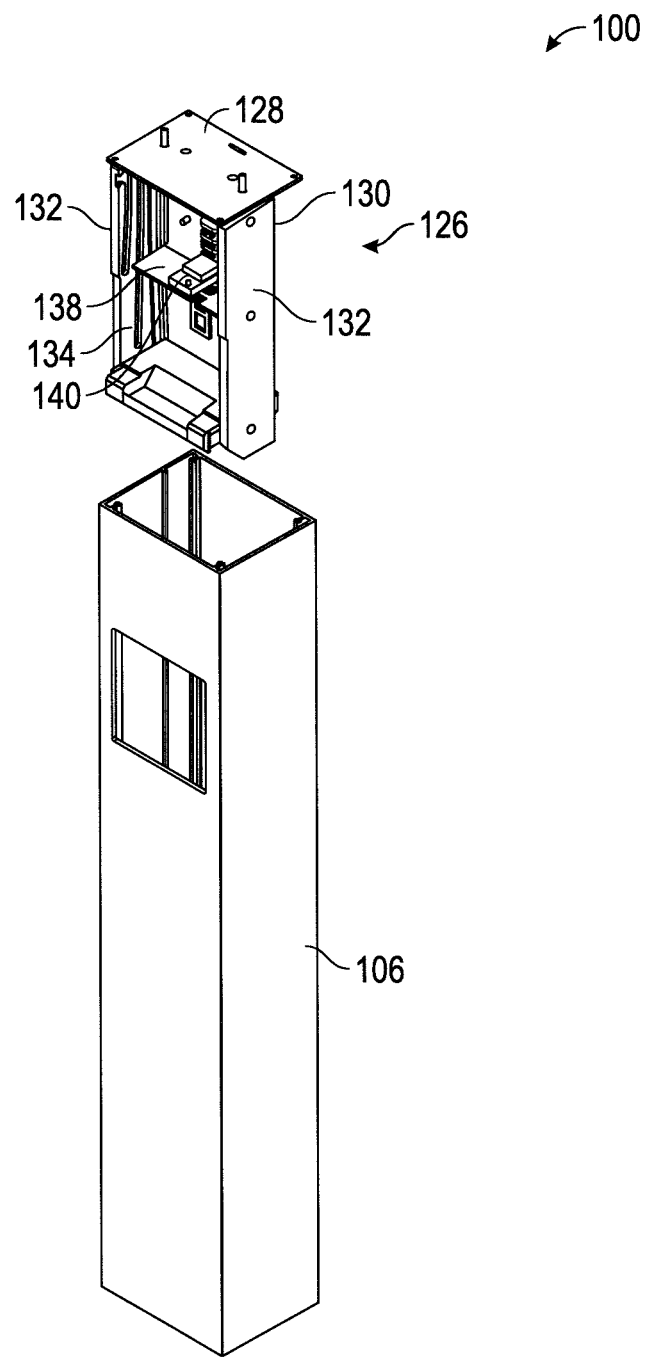
FIG. 3 is a front perspective view of the charging station shown in FIG. 1 with the light fixture assembly removed and the power module exploded from the frame.

FIG. 3 shows a perspective view of charging station 100 with the lighting assembly 104 removed. In FIG. 3, a power module 126 that is normally within outer housing 106 of main assembly 102 is shown removed from and above the outer housing 106. Power module 126 is configured and dimensioned such that it can be inserted into frame 106 from the top of frame 106 and can be removed from frame 106 from the top of frame 106. Power module 126 includes a top portion 128, a back portion 130, and two side portions 132. Each side portion 132 has a track member 134 mounted to its inner surface. A flange 138 extends from the back portion 130 approximately mid-height of the power module 126. When the power module 126 is inserted into the housing 106, the wiring devices 118, 120, shown in FIG. 2, which are mounted to the power module 126 below the flange 138, as discussed below, are accessible through the opening in the housing 106 when the door 108, shown in FIG. 2, is in the open position. A switch light 140 is mounted to the flange 138. A light in switch light 140 illuminates the internal chamber 116 when the door 108 is opened. The switch light 140 is positioned such that a plunger on the switch light is pressed down when the door 108 is in the closed position, thereby opening the circuit powering the light in switch light 140. When the door 108 is opened, the plunger is no longer depressed and the light is powered.

Figure 4:
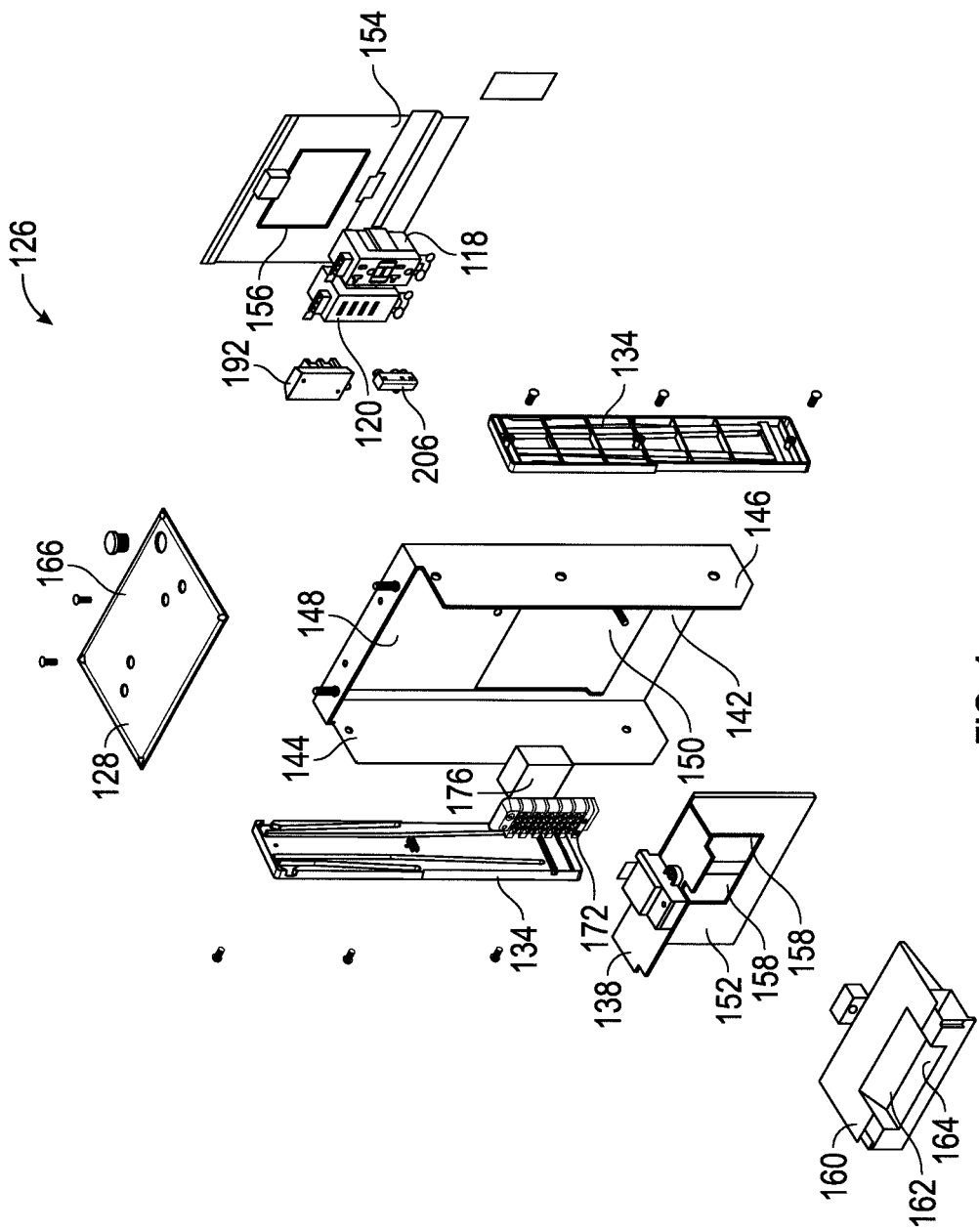
FIG. 4 is a front perspective exploded view of the power module of the charging station shown in FIG. 1.

FIG. 4 shows a perspective exploded view of the power module 126 of the charging station 100. Power module 126 includes a main body 142. Side walls 144, 146 form the side portions 132 of the power module 126. Side walls 144, 146 each have a track member 134 mounted to its inner surface. Back wall 148 forms a large part of back portion 130 of the power module. Back wall 148 includes a large rectangular opening 150. A front plate 152 and a back plate 154 cover the opening 150 on the front and back sides, respectively. Wiring devices are mounted to back plate 154 and partially pass through an opening 156 in that back plate such that their screw terminals are on the back side of the power module 126. Front plate 152 has openings 158. The wiring devices 118, 120 pass through openings 158 so that their front faces are accessible from the interior space 116, shown in FIG. 2, when the power module 126 is inserted in the outer housing 106, shown in FIG. 3. Front plate 152 and back plate 154 are secured to power module 126 using, for example, machine screws or the like. Flange 138 may be in the form of an extension on front plate 152 that is bent so that it extends substantially perpendicularly from the face of front plate 152 to form a top surface of the internal chamber 116, shown in FIG. 2. A door stop member 160 forms the bottom surface of internal chamber 116, shown in FIG. 2. The top surface of the door stop member includes an angled surface 162 and a recessed surface 164. These two surfaces allow a user to wrap his or her fingers around the bottom of the door 108, shown in FIG. 1, when the door 108 is in the closed position so that the user can manipulate the door 108 to the open position. Additionally, the surfaces 162, 164 allow egress for cords of the items plugged into the wiring devices 118, 120 of the charging station 100. Top portion 128 is formed by mounting a plate 166 to the top of main body 142 with, for example, machine screws. Top plate 166 extends backwards beyond back wall 148 of main body 142. An installer or maintenance person can grip this back portion of top plate 166 to remove the power module 126 from the frame 106 of main assembly 102 of charging station 100.

Because wiring devices 118, 120 are mounted to back plate 154 of power module 126, instead of directly to housing 106 of the main assembly of charging station 100, the wiring devices are positioned to be recessed from the outer surface of the charging station 100 within the internal compartment 116, shown in FIG. 2. Thus, an additional structure protruding outward from the outer surface of the charging station 100 does not need to be added to cover the wiring devices 118, 120 and to protect them from the elements. Rather, door 108, which is substantially flush with the outer surface of the charging station 100, both provides access to the wiring devices 118, 120 when open and protects the wiring devices 118, 120 from the elements when closed.

Figure 9:
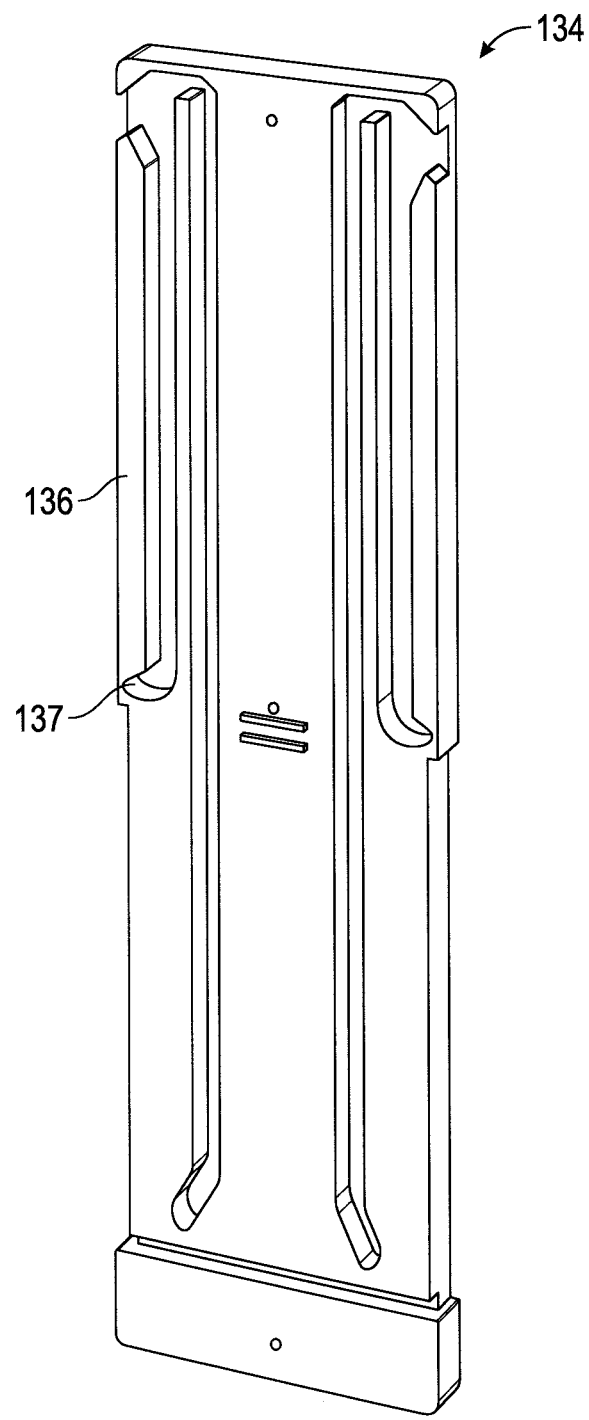
FIG. 9 is a front perspective view of a track member of the power module shown in FIG. 4.

FIG. 9 is a front view of track member 134. Each track member 134 contains at least one track 136. Each track member can include two tracks 136 as shown that are mirror images of each other about an imaginary plane that is perpendicular to the plane of the front face of track member 134 and that includes the longitudinal axis of the track member 134. This provides interchangeability by allowing identical track members 134 to be installed on both side wall 146 and side wall 144 of main body 142 of power module 126. Protrusions on each side of the door 108 ride in tracks 136 in opposing track members 134 so that the door 108 can slide between open and closed positions. Each track 136 contains a curved portion 137. Door 108 moves both vertically and horizontally when its protrusions move in the curved portions of the tracks 136. This permits the door to be flush with the outer surface of the frame 106 when closed and to be recessed from the frame 106 when it is opened.

Figure 10:
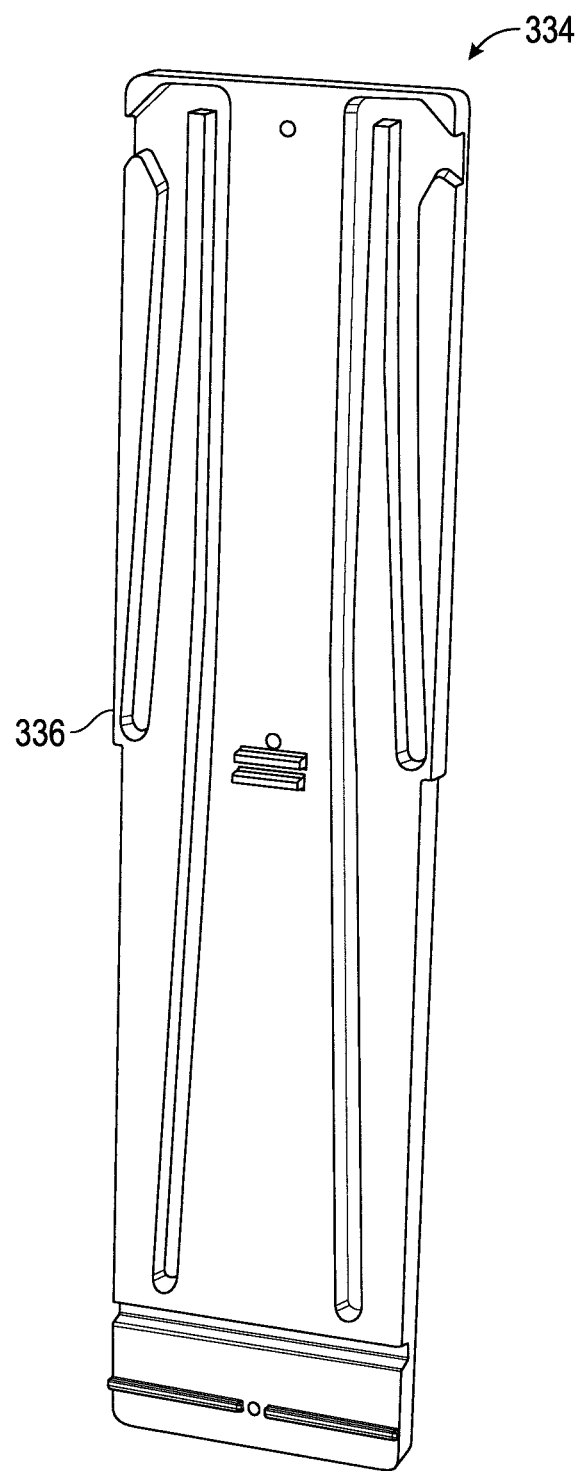
FIG. 10 is a front perspective view of an alternate embodiment of a track member of the power module shown in FIG. 4.

FIG. 10 shows an alternate embodiment of the track member 334 having at least one track 336. Each track 336 is substantially straight. The track member 334 allows the door 108 to be substantially flush with the outer surface of the frame 106 with the door 108 being slightly offset. For example, the door may be offset about 0.188 inches.

Figure 5:
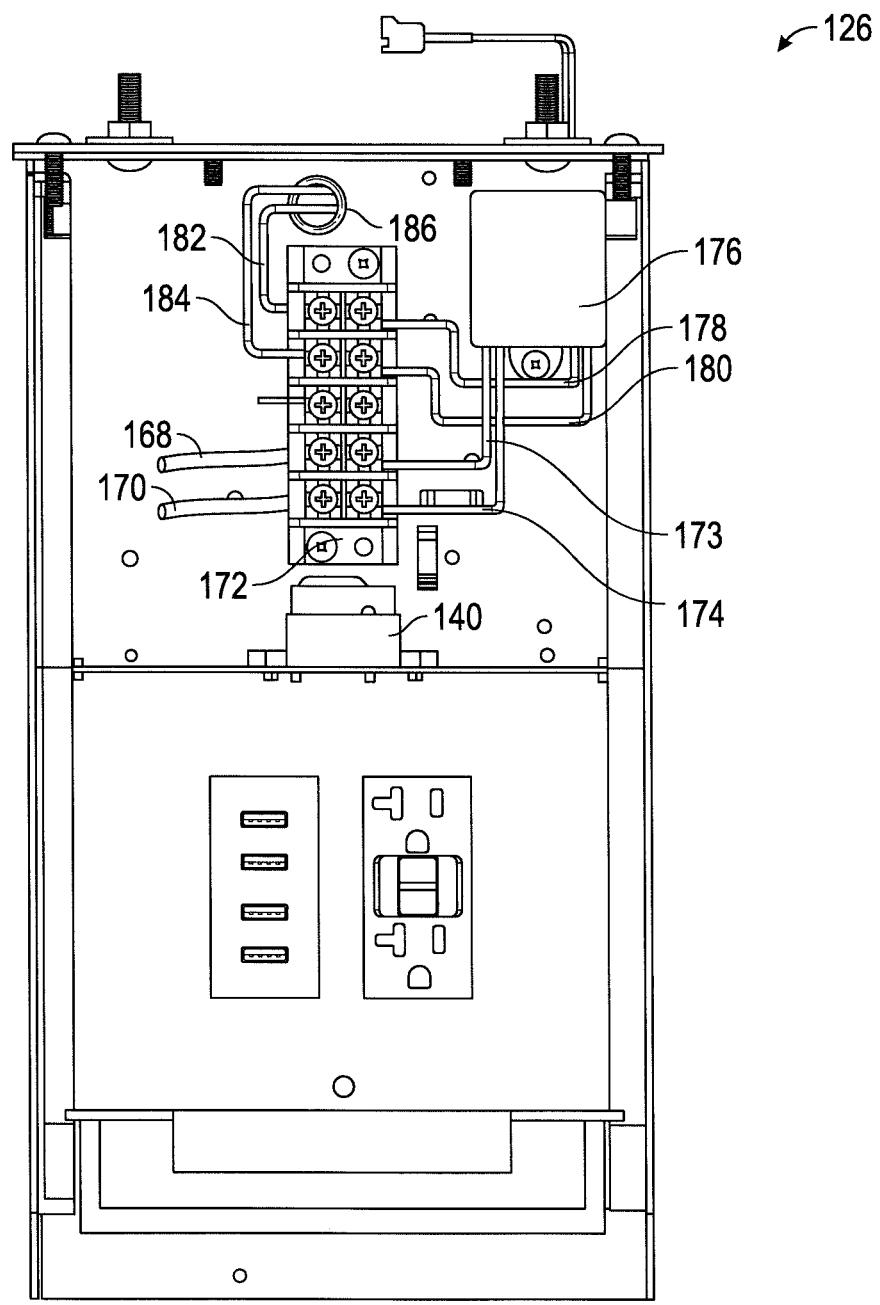
FIG. 5 is a front view of the power module of the charging station shown in FIG. 1.

FIG. 5 shows a front view of the power module 126 of the charging station shown in FIG. 1. As shown in FIG. 5, power wires 168, 170 routed through a conduit (not shown) running through the height of the charging station are connected to two terminals of a termination block 172. Power wires 168, 170 can, for example, carry 277 Volts of AC power, which is a common voltage used to power LED driver circuits. Termination block 172 electrically connects power wires 168, 170 to wires 173, 174. The opposite ends of wires 173, 174 are connected to input terminals on LED driver 176. Wires 178, 180 are electrically connected to output terminals on LED driver 176 and carry low-voltage DC power for powering LED lights. The opposite ends of wires 178, 180 are connected to terminals on termination block 172. Termination block 172 electrically connects wires 178, 180 to wires 182, 184. Wires 182, 184 pass through an opening 186 in back wall 148 to the opposite side of the power module 126.

Power wires 168, 170 can be connected directly to LED driver 176 instead of using termination block 172 and wires 174, 173. However, termination block 172 allows for pre-wiring of the LED driver 176, which eases installation. For example, wires 174, 173 can be pre-wired to both the termination block 172 and the LED driver 176 before installation of the charging station 100, shown in FIG. 1. Thus, at installation of the charging station 100, shown in FIG. 1, LED driver 176 can be powered simply by connecting power wires 168, 170 to the termination block 172. This is an easier connection to make than connecting power wires 168, 170 directly to LED driver 176. Wires 178, 180 and 182, 184 may also be pre-connected to termination block 172.

Figure 6:
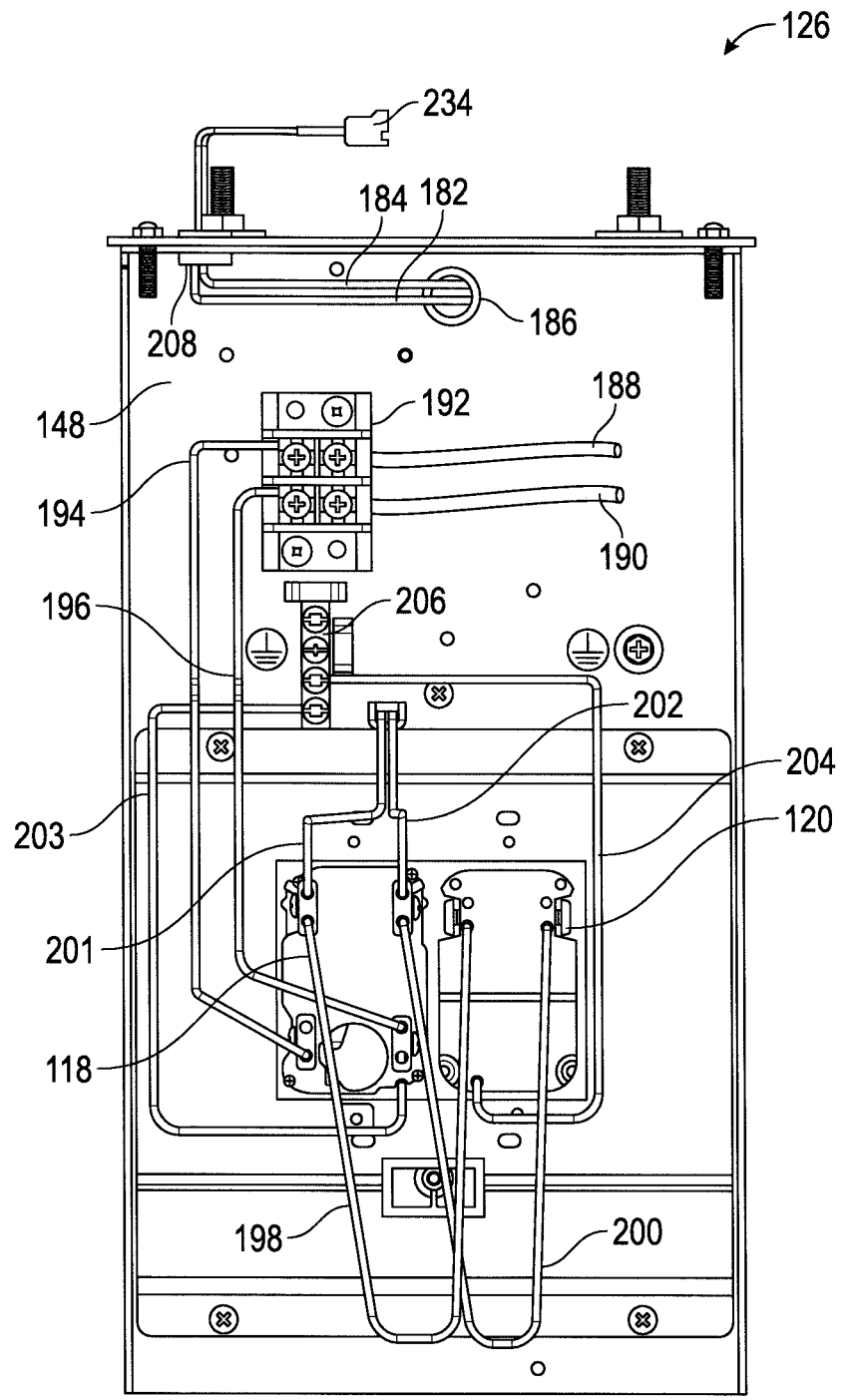
FIG. 6 is a rear view of the power module of the charging station shown in FIG. 1.

FIG. 6 shows a rear view of the power module 126 of the charging station 100, shown in FIG. 1. As shown in FIG. 6, power wires 188, 190 routed through a conduit (not shown) running inside frame 106 of the charging station are connected to two terminals of a termination block 192. Power wires 188, 190 can carry, for example, 120 Volts of AC power, which is a common voltage used to power wiring devices. Termination block 192 electrically connects power wires 188, 190 to wires 194, 196. The opposite ends of wires 194, 196 are connected to the line terminals on wiring device 118. Wires 198, 200 are electrically connected to load terminals on wiring device 118 and line terminals on wiring device 120 to create a daisy-chain connection for powering wiring device 120. Wires 201, 202 are electrically connected to load terminals on wiring device 118 and switch light 140 to create a daisy-chain connection for powering the switch light 140. Ground wires 203, 204 are connected on one end to a ground terminal on wiring devices 118, 120, respectively, and on the other end to terminal block 206. Terminal block 206 is electrically connected to back wall 148 of main body 142 of power module 126 to provide a grounding connection.

Power wires 188, 190 can be connected directly to wiring device 118 instead of using termination block 192 and wires 194, 196. However, termination block 192 allows for pre-wiring of wiring devices 118, 120, which eases installation. For example, wires 194, 196 may be pre-wired to both the termination block 192 and the line terminals of wiring device 118 before installation of the charging station 100, shown in FIG. 1. Additionally, wires 198, 200 may be pre-wired to wiring devices 118 and 120 before installation of the charging station 100, shown in FIG. 1, wires 201, 202 may be pre-wired to wiring device 118 and switch light 140, and ground wires 203, 204 can be pre-wired to wiring devices 118, 120, respectively, and termination block 206. Thus, at installation of the charging station 100, shown in FIG. 1, wiring devices 118 and 120 can be powered simply by connecting power wires 194, 196 to the termination block 192. This is an easier connection to make than connecting power wires 194, 196 directly to wiring device 118.

Power wires 168, 170, shown in FIG. 5, and power wires 188, 190 are on different branch circuits. Thus, electrical terminations in the branch circuit including power wires 168, 170, shown in FIG. 5, and electrical terminations in the branch circuit including power wires 188, 190 must be separated from each other by a barrier for code compliance. Back wall 148 of main body 142 of power module 126 provides that separating barrier that is required by for code compliance.

As stated above, wires 182, 184 pass through opening 186 in back wall 148 to the rear side of the power module 126. Wires 182, 184 exit the power module 126 and enter the lighting assembly 104, shown in FIG. 1, by passing through an opening 208 in the top plate 166, shown in FIG. 4.

Figure 7:
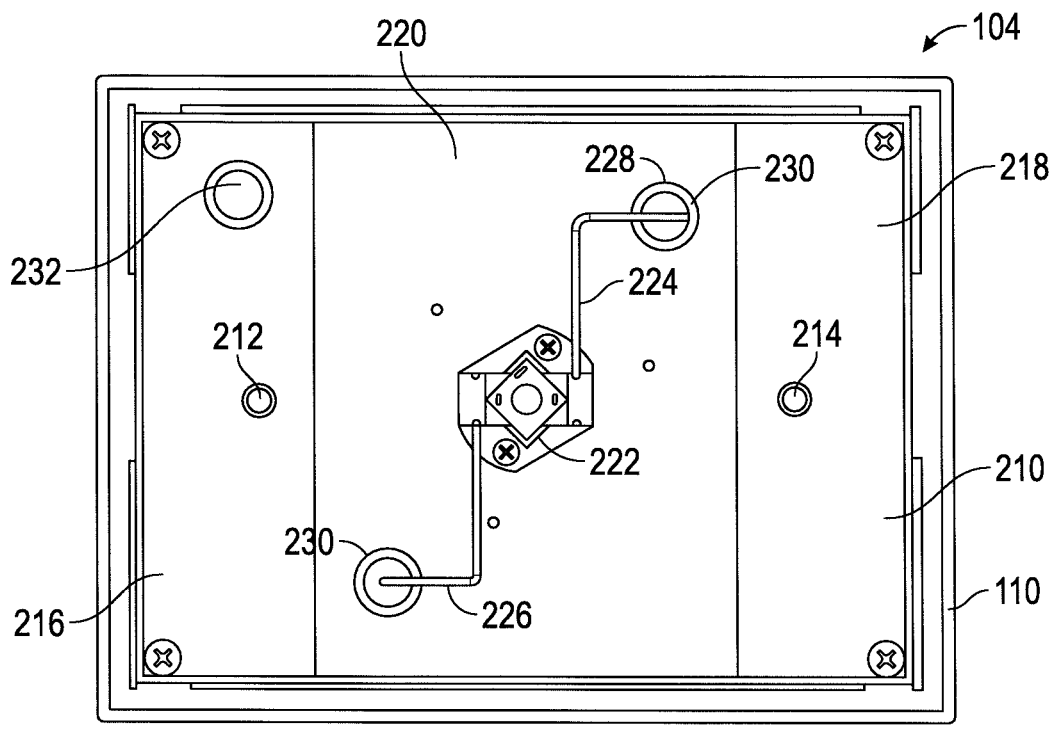
FIG. 7 is a bottom view of the lighting assembly of the charging station shown in FIG. 1.

FIG. 7 is a bottom view of the lighting assembly 104. Lighting assembly 104 includes a plate 210. Plate 210 is connected to outer housing 110 of lighting assembly with, for example, machine screws or the like. Plate 210 has openings 212, 214 for receiving bolts for connecting plate 210 to top plate 166, shown in FIG. 4, of power module 126, shown in FIG. 3, to secure lighting assembly 104 to main assembly 102, shown in FIG. 1. Plate 210 does not sit in a single plane. Rather, the side regions 216, 218 are lower than the middle region 220, thereby creating a pocket in middle region 220. An LED light module 222 is mounted to the middle region of the bottom of plate 210 and sits in that pocket. Wires 224, 226 that extend from a chamber on the other side of plate 210 in a manner that will be described in more detail below are connected to LED light module 222. Wires 224, 226 pass through openings 228, 230, respectively, in plate 210. Wires 182, 184 that are connected on one end to terminal block 172 on the front side of the power module 126, as shown in FIG. 5, pass from the bottom of plate 210 to the top of plate 210 through an opening 232.

Figure 8:
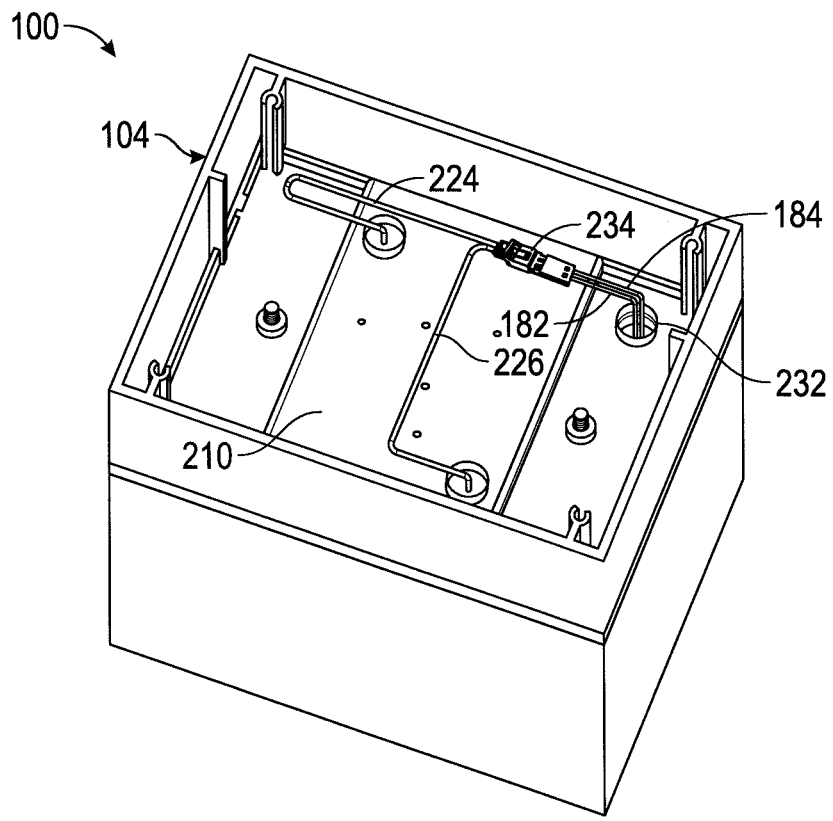
FIG. 8 is a top perspective view of the charging station shown in FIG. 1 with the cover of the lighting assembly removed.

FIG. 8 shows a top perspective view of the charging station 100 with the cover of the lighting assembly 104 removed. After passing through opening 232 in plate 210, wires 182, 184 are connected at their ends to one member of an electrical quick-connector 234. The other end of the electrical quick-connector 234 is connected to ends of wires 224, 226 that are opposite to the ends of those wires connected to LED light module 222, as shown in FIG. 7. The use of electrical quick-connector allows for easier assembly and disassembly of the lighting assembly 104 to the main assembly 102, shown in FIG. 1. In particular, wires 224, 226 can be pre-connected to LED light module 222, shown in FIG. 7. As such, when installing the charging station 100, the only connection that has to be made to power the LED light module 222, shown in FIG. 7, is the connection of the two members of the electrical quick-connector 234. When the lighting assembly 104 needs to be removed to, for example, access the power module 126, as shown in FIG. 3, the only electrical connection that needs to be broken is the connection between the two members of the electrical quick-connector 234. If wires 182, 184 were directly connected to LED light module 222, shown in FIG. 7, then those electrical connections would need to be disconnected every time the light assembly 104 was disassembled from the main assembly 102, shown in FIG. 1, which would be highly inconvenient given the location and accessibility of the LED light module 222, shown in FIG. 7.

Figure 11:
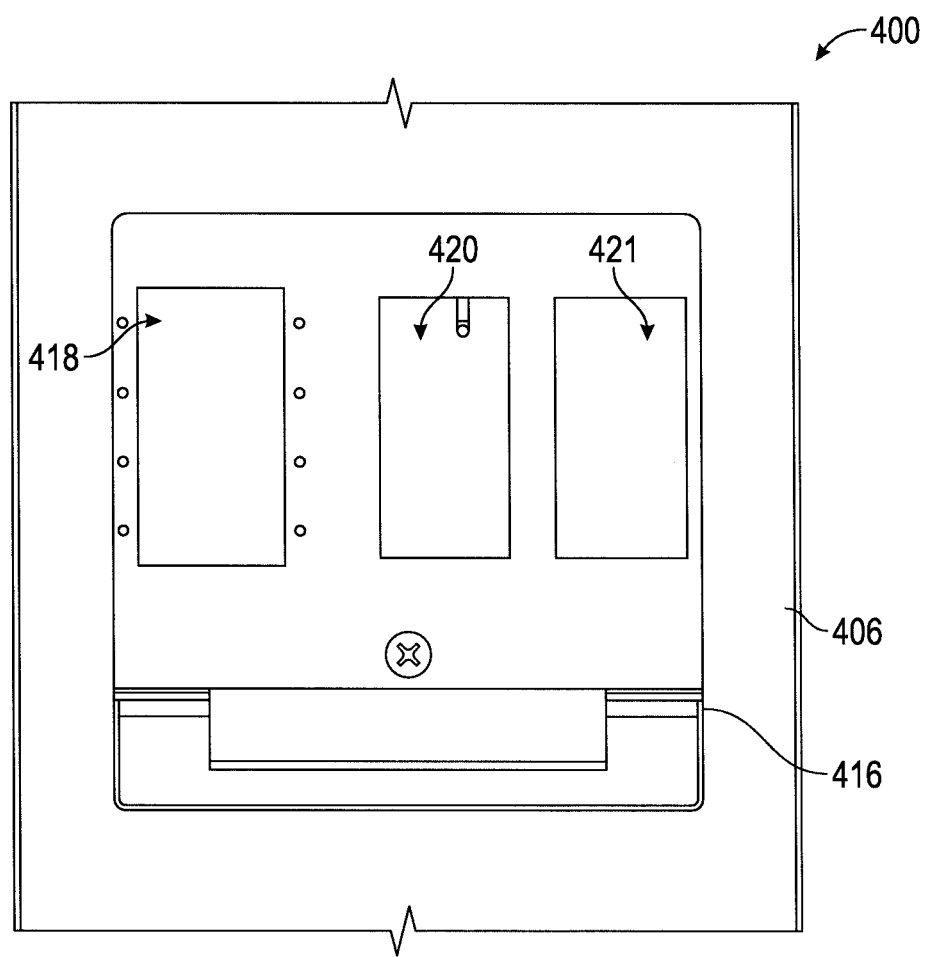
FIG. 11 is a front view of a portion of the charging station shown in FIG. 1 with the sliding door in the open position, showing an alternate embodiment.

Although the charging station 100, shown in FIG. 2, has been described in connection with two wiring devices 118, 120, The charging station 100, shown in FIG. 2, may include additional wiring devices. For example, referring to FIG. 11, a charging station 400 with its sliding door in the open position includes three openings 418, 420, 421 to accommodate three such as the wiring devices 118, 120, shown in FIG. 2. The wiring devices may include receptacles for making power connections for receiving a standard electrical plug, charging connections for receiving a USB plug, such as a USB Type-C connector, and/or data or audio/visual ("AV") connections for receiving data and/or AV devices.

The data and/or AV devices may include devices such as, for example, speaker, microphone, or phone jack connections. Thus, charging station 400 can provide connections to power, charge electrical devices, and provide data/AV connections. The data connections may be part of a third branch circuit on the back side of the power module. The charging station may include any combination of the three wiring devices, including a combination of all same three devices. Any of the different branch circuits, including the first, second and third branch circuits described above, may provide either AC power or DC power depending upon the intended application.

Figure 12:
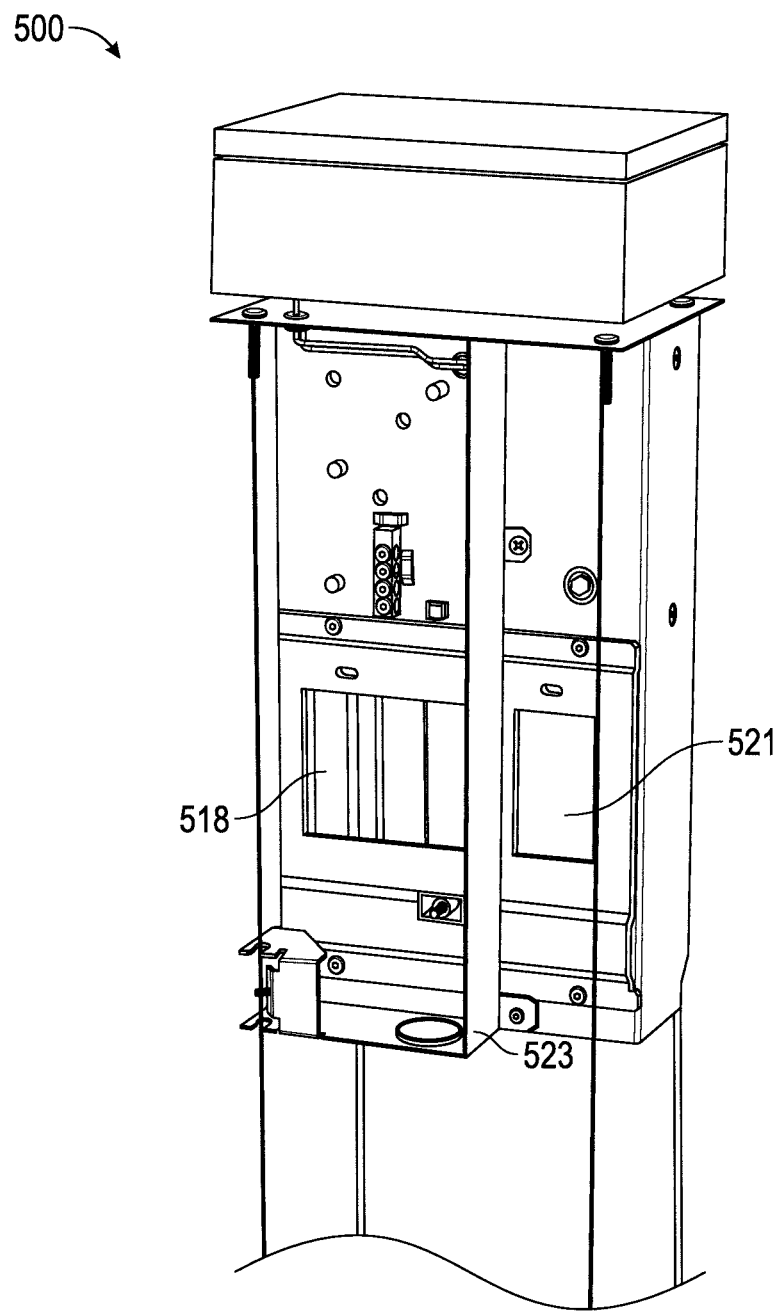
FIG. 12 is a rear perspective view of a portion of the charging station shown in FIG. 1 with the sliding door in the open position, showing an alternate embodiment.

FIG. 12 shows another charging station 500 that accommodates three wiring devices. The charging station 500 includes a two-gang opening 518 for accommodating two wiring devices, such as wiring devices 118, 120, shown in FIG. 2, and a separate single gang opening 521 for accommodating a third wiring device. A divider 523 is positioned to separate the two-gang opening 518 from the single gang opening 521. The two-gang opening 518 may accommodate any combination of power and/or charging connections, while the single gang opening 521 may accommodate data/AV connections. The data connections may be disposed on the back side of the power module and may be separated from the first branch circuit and second branch circuit discussed above, by the divider 523. The divider 523 provides separation between the power/charging wiring and the data wiring, which is mandated by code.

Figure 13:
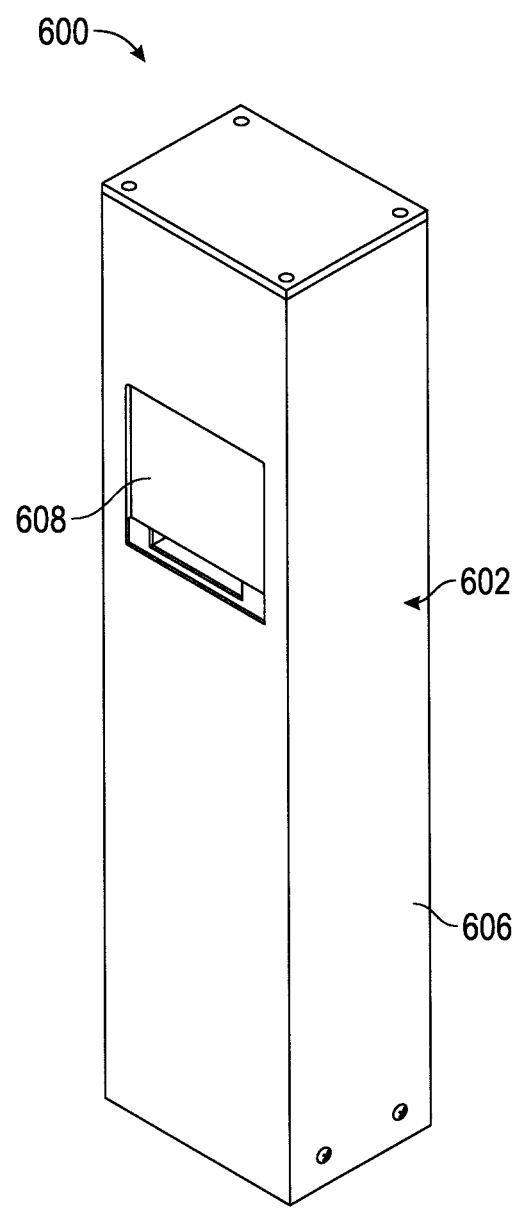
FIG. 13 is a front perspective view of a charging station according to another embodiment of the present disclosure.

FIG. 13 shows an alternate embodiment of a charging station 600 including a main assembly 602, but that does not include a lighting assembly. Main assembly 602 includes an elongated outer frame 606. The front of frame 606 contains an opening that can be closed with a sliding door 608, which is substantially flush with the outer frame 606. The charging structure 600 is substantially the same as the charging station 100, shown in FIG. 1, in detail and configuration but for the lighting assembly and, therefore, will not be discussed in detail. The charging station 600 may provide up to three connections to power, charge electrical devices, and provide data/AV connections. The charging station may include any combination of the three wiring devices, as discussed above.

Figure 14:
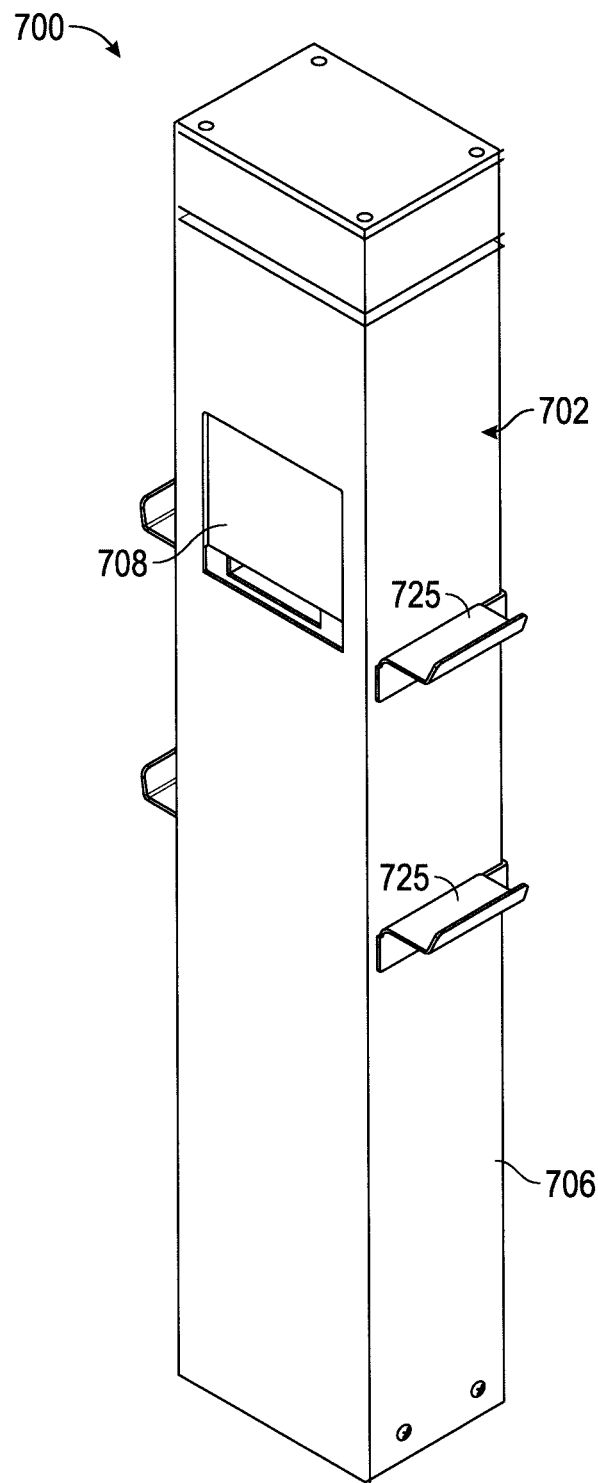
FIG. 14 is a front perspective view of a charging station according to a further embodiment of the present disclosure.

FIG. 14 shows an embodiment of a charging station 700 including a main assembly 702 and shelves 725. At least one shelf 725 extends from the outer frame 706 to provide space for a phone or other item to be placed onto the shelf, during charging or powering, for example. The charging structure 700 is, otherwise, substantially the same as the charging station 100, shown in FIG. 1, in detail and configuration and, therefore, will not be discussed in detail.

Figure 15:
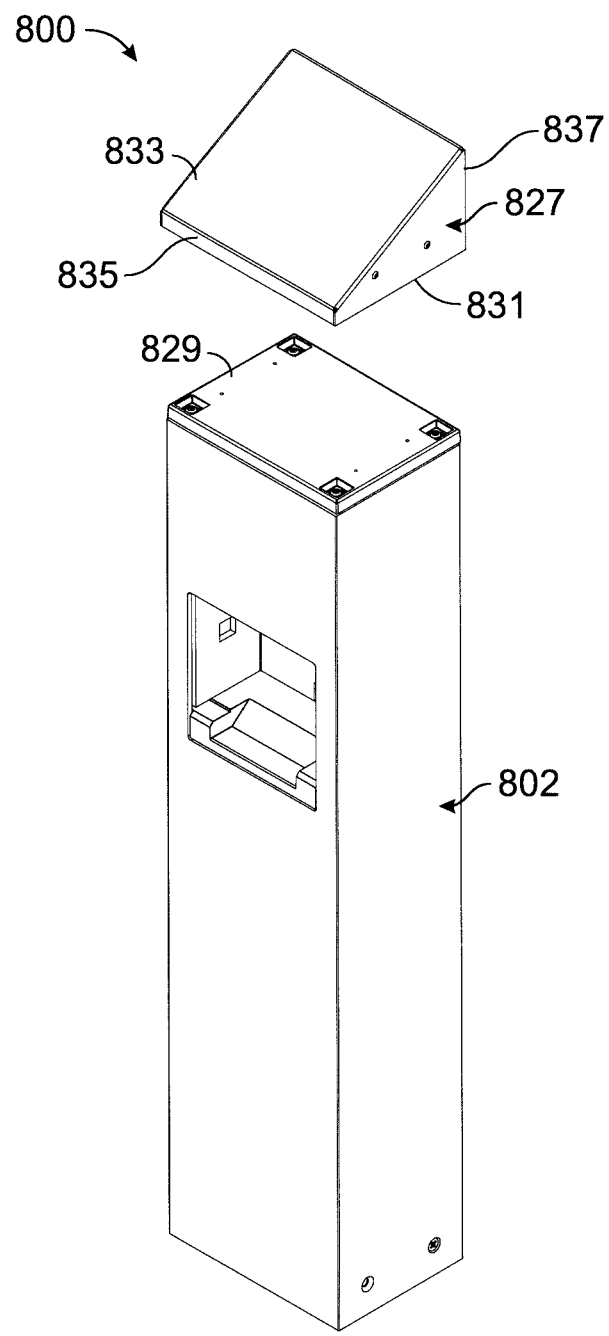
FIG. 15 is a partially exploded front perspective view of a charging station with a cap according to the present disclosure.
Figure 16:
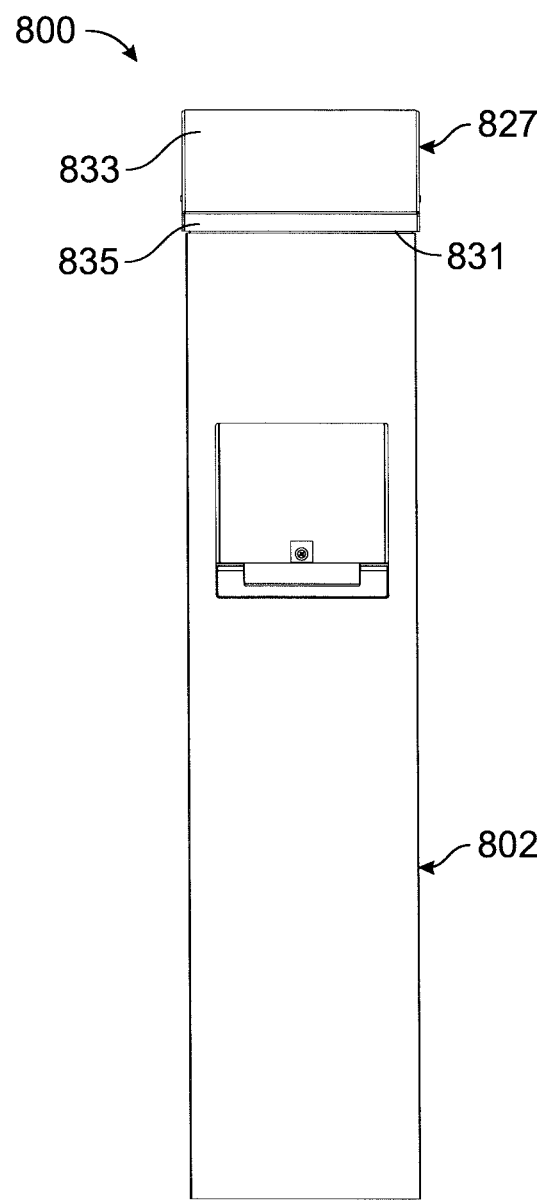
FIG. 16 is a front view of the charging station with the cap of FIG. 15.
Figure 17:
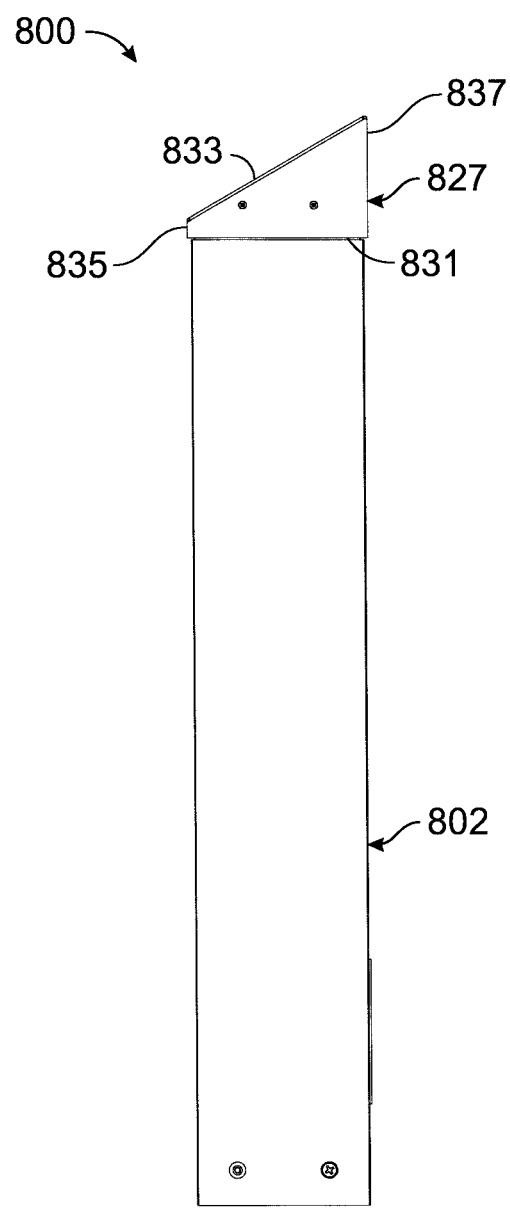
FIG. 17 is a side view of the charging station with the cap of FIG. 15.

Referring to FIGS. 15-17, a charging station 800 including a main assembly 802 and a cover assembly 827 is shown. The cover assembly 827 is configured to interface with an upper end of the main assembly 802 (or lighting module/assembly if the charging station is so equipped) to cover an upper surface 829 of the main assembly 802 (or lighting module/assembly). The cover assembly 827 includes a flat lower edge 831 that is located adjacent to the upper surface 829 when the cover assembly 827 is attached to the main assembly 802 and an upper surface 833 that is angled relative to the flat lower edge 831 to provide the cover assembly 827, or an upper portion of the cover assembly 827, with a triangular profile. For example, as shown, the upper surface 833 is inclined at an angle of approximately thirty degrees from a front end 835 of the cover assembly 827 to a rear end 837 of the cover assembly 827. Although the upper surface 833 is shown entirely at an incline from the front end 835 to a rear end 837, the upper surface 833 may have various other angled configurations, which are within the scope of the present application. For example, the upper surface 833 may be inclined from the rear end 837 to the front end 835, from one side to the opposite side, or the upper surface 833 may include a centrally located peak, with the upper surface 833 being inclined from two or more edges to the centrally located peak. For example, the upper surface 833 may have an incline from the font end 835 to the centrally located peak and also an incline from the rear end 837 to the centrally located peak.

The angled upper surface 833 advantageously discourages or prevents a person from sitting or placing an item on the top of the charging station 800, such as a beverage container or the like. The angled upper surface 833 may also advantageously prevent snow from gather on the charging station 800 and/or may help with water runoff due to snow melting, rain or the like.

Figure 18:
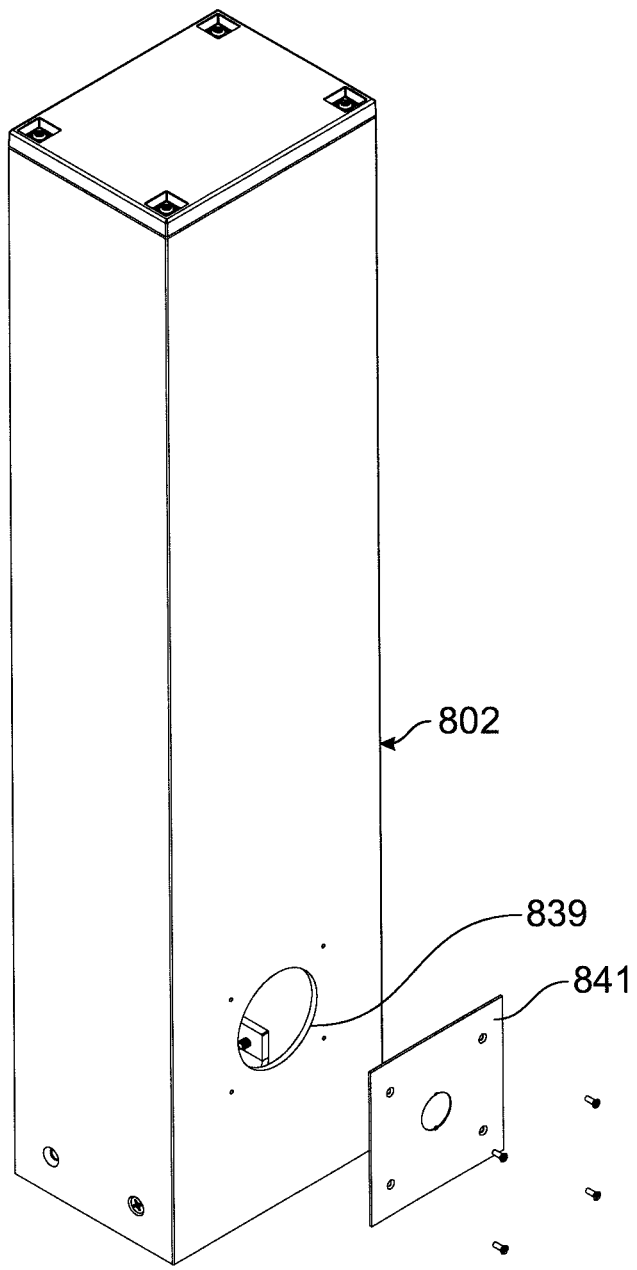
FIG. 18 is a rear perspective view of the charging station of FIG. 15.

Referring to FIG. 18, the main assembly 802 may include a wiring opening 839 formed through the back side of the main assembly 802 and a removable cover 841 adapted to cover and close the wiring opening 839 when the wiring opening 839 is not being used. The wiring opening 839 allows power and/or data wiring, such as power wires 168 and 170 shown in FIG. 5, to be fed into the main assembly 802 through the back side of the main assembly 802 rather than through the bottom of the main assembly 802. Feeding the wiring through the wiring opening 839 may be advantageous when the charging station 800 is installed next to or near the side of a structure, such as a building or the like, because the wiring opening 839 allows for the wiring of the charging station 800 without the need to run the power and/or data wiring underground from a power source, such as a building or the like, to the charging station 800. Where the charging station 800 is located adjacent a building or other structure, the charging station 800 may also advantageously be mounted on and secured to the building or other structure, rather than to the ground. Alternatively, the removable cover 841 may be attached to the main assembly 802 to close the wiring opening 839 and the power and/or data wiring may be fed into the main assembly 802 through the bottom of the main assembly 802, for example, after running the power and/or data wiring underground.

Other than the cover assembly 827 and wiring opening 839 and removable cover 841, the charging station 800 may be the same in detail and configuration as any of the charging stations 100, 500, 600, or 700, shown in FIGS. 1, 12, 13, and 14, respectively, and, therefore, will not be discussed in detail.

The charging stations of the present disclosure advantageously allow power, charging and/or data connection to be made outdoors, even in inclement weather, with the power modules disposed within the charging stations. Since the power modules are located inside the charging station, the charging stations of the present disclosure provide a more reliable and waterproof environment than conventional bollards. Additionally, the charging stations also provide lighting allowing an efficient and reliable approach to providing power, charging and/or data connections as well as light outdoors. Furthermore, the disclosed charging stations are easily installable and repairable.

As will be recognized by those of ordinary skill in the pertinent art, numerous changes and modifications may be made to the above-described embodiments of the present disclosure without departing from the spirit of the invention as defined in the appended claims. Accordingly, the particular embodiments described in this specification are to be taken as merely illustrative and not limiting.

What is claimed is:

1. A charging station, comprising:
    a main assembly having an outer frame forming an internal chamber and a power module disposed within the internal chamber and enclosed by the frame, the power module including at least one receptacle forming a power connection, charging connection, or a data connection; and
    a cover assembly configured to be mounted at an upper end of the main assembly, the cover assembly including an upper surface sloped relative to an upper surface of the main assembly.

2. The charging station of claim 1, wherein the power module is removable as a unit from the internal chamber of the main assembly.

3. The charging station of claim 2, wherein the power module can slide into and slide out of the internal chamber of the main assembly when the cover assembly is detached from the main assembly.

4. The charging station of claim 2, wherein electrical connections on a front side of the power module are part of a first branch circuit and electrical connections on a back side of the power module are part of a second branch circuit.

5. The charging station of claim 4, wherein the power wires of the first branch circuit provide a different voltage than the power wires of the second branch circuit.

6. The charging station of claim 4, additionally comprising data connections that are part of a third branch circuit on the back side of the power module.

7. The charging station of claim 6, wherein the data connections are disposed on the back side of the power module and are separated from the first branch circuit and second branch circuit by a divider.

8. The charging station of claim 1, further comprising a lighting assembly positioned between the main assembly and the cover assembly, the cover assembly being mounted on top of the lighting assembly.

9. The charging station of claim 1, wherein the upper surface of the cover assembly is sloped upward from a front end of the cover assembly to a rear end of the cover assembly.

10. The charging station of claim 1, further comprising a wiring opening formed through the back side of the main assembly proximate a lower end of the main assembly.

11. The charging station of claim 10, further comprising a removable cover secured to the main assembly over the wiring opening.

12. The charging station of claim 1, further comprising a sliding door that when open provides access to the at least one receptacle forming the power, charging, or data connection of the power module through an opening in the frame and when closed prohibits access to the at least one receptacle forming the power, charging, or data connection of the power module through the opening in the frame.

13. The charging station of claim 12, wherein when closed, the sliding door is substantially flush with the outer surface of the frame of the main assembly.

14. The charging station of claim 12, further comprising a switch light that illuminates the chamber when the sliding door is open.

15. The charging station of claim 12, further comprising two door track members mounted on opposite sides of the power module;
    wherein the sliding door includes a first protrusion that can translate within a track formed in the first track member and the sliding door includes a second protrusion that can translate within a track formed in the second track member.

16. The charging station of claim 15, wherein each track member has a curved portion that allows the sliding door to move both vertically and horizontally when the first and second protrusions translates within the curved portions of the tracks in the first and second track members.

17. The charging station of claim 15, wherein each track member includes two tracks that are mirror images of each other about an imaginary plane that is perpendicular to the front face of the track member and that includes the longitudinal axis of the track member.

18. The charging station of claim 1, further comprising at least one shelf extending from the outer frame for providing space for items to be charged or powered.

19. The charging station of claim 1, wherein the at least one receptacle forming the power connection, charging connection, or data connection is recessed from the outer frame within the internal chamber.

20. A charging station comprising:
    a main assembly having an outer frame forming an internal chamber and a power module disposed within the internal chamber and enclosed by the frame, the power module including at least one receptacle forming a power connection, charging connection, or a data connection;
    a lighting module mounted on top of the main assembly and including a light source; and
    a cover assembly mounted on top of the lighting module, the cover assembly including an upper surface sloped relative to an upper surface of the lighting module.

21. The charging station of claim 19, wherein the power module is removable as a unit from the internal chamber of the main assembly; and
    wherein the power module is configured to slide into and slide out of the internal chamber of the main assembly when the lighting module and cover assembly are removed.

22. The charging station of claim 20, wherein the at least one receptacle forming the power connection, charging connection, or data connection is recessed from the outer frame within the internal chamber.

* * * * *